United States Patent [19]
Stepanek

[11] Patent Number: 5,871,608
[45] Date of Patent: Feb. 16, 1999

[54] METHOD FOR TRANSFERRING A METALLIZED HOLOGRAPHIC IMAGE

[75] Inventor: Michael J. Stepanek, Hollis, N.H.

[73] Assignee: Hampshire Holographic Manufacturing Corp., Milford, N.H.

[21] Appl. No.: 824,913

[22] Filed: Mar. 27, 1997

[51] Int. Cl.⁶ .................................................. B44C 1/165
[52] U.S. Cl. ...................... 156/233; 156/237; 428/914; 428/209; 428/457; 428/464
[58] Field of Search .................... 428/195, 916, 428/200, 209, 457, 464, 532, 537.5, 914, 915; 283/86, 84; 156/309.6, 233, 239, 237; 359/1

[56] References Cited

U.S. PATENT DOCUMENTS

| | | | |
|---|---|---|---|
| 4,728,377 | 3/1988 | Gallagher | 156/58 |
| 4,758,296 | 7/1988 | McGrew | 156/231 |
| 4,838,965 | 6/1989 | Bussard | 156/83 |
| 4,893,887 | 1/1990 | Coates | 350/3.6 |
| 4,906,315 | 3/1990 | McGrew | 156/231 |
| 4,913,504 | 4/1990 | Gallagher | 350/3.6 |
| 4,978,593 | 12/1990 | Yin et al. | 430/2 |
| 5,155,604 | 10/1992 | Miekka et al. | 359/2 |
| 5,231,520 | 7/1993 | Yoshinaga et al. | 359/3 |
| 5,248,544 | 9/1993 | Kaule | 428/195 |
| 5,344,808 | 9/1994 | Watanabe et al. | 503/227 |
| 5,397,662 | 3/1995 | Miller | 430/1 |
| 5,510,911 | 4/1996 | Sharpe et al. | 359/1 |
| 5,517,336 | 5/1996 | Moleé | 359/1 |
| 5,593,765 | 1/1997 | Sharpe et al. | 428/225 |
| 5,634,669 | 6/1997 | Colgate, Jr. | 283/58 |

Primary Examiner—Marie Yamnitzky

[57] ABSTRACT

A holographic image that has been transferred from a conventional polymeric support to a board stock element is described in this invention. A host of images may be envisioned and since this image, on a board stock element, may then be wound up in a roll, it can be used in the manufacture of boxes, containers and the like. The board stock element containing the holographic image may also be used in sheets for advertisements and the like. This element and process permits the wide spread use of such holographic images, such use not being available until now.

4 Claims, 2 Drawing Sheets

METHOD FOR TRANSFERRING A METALLIZED HOLOGRAPHIC IMAGE

CROSS-REFERENCE TO RELATED APPLICATIONS

This application is related to my previously filed applications U.S. Ser. No. 08/679,347, filed Jul 9, 1996 (now U.S. Pat. No. 5,662,986) and U.S. Ser. No. 08/679,348, filed Jul. 9, 1996 (now U.S. Pat. No. 5,735,989) and is a Continuation-in-Part of both of these applications.

BACKGROUND OF THE INVENTION

1. Field of the Invention

This invention relates to holographic images formed by a unique process for various security and decorative purposes. Also, this invention relates to aluminized roll-stock holographic images formed on a plastic layer. Further, this invention relates to elements and process for transferring holographic images to yet another substrate. Still further, this invention relates to a unique process for transferring holographic images to a relatively inexpensive substrate which permits a wide-spread use of said holographic image.

2. Description of the Prior Art

Holographically enhanced materials are well known in the prior art. These are usually made by very proprietary methods which includes passing a layer of plastic, for example, through a machine which imparts a variation (e.g. which can be an image itself) within covering or upper strata of the plastic layer. This step is somewhat similar to, but not exactly the same, as embossing. A powdered metallic element (e.g. aluminum) is then applied thereon by the so-called metallizing process. After this step, the element appears to have a two or three dimensional diffractional grating holographic image imparted on the layer of plastic. This image is extremely pleasing and is widely used within the credit card and security industries, for example, to impart an image particular to that credit card or to provide a security element thereon. The resulting image is difficult to duplicate and thus these elements assist in the prevention of fraud by counterfeiting, for example. The draw-back to the use of these images is the cost since the machines to produce the image are complicated and costly in and of themselves. Additionally, holographic elements produced by this method (the so-called "shim" method") are usually small in size and thus cannot be imprinted with larger images. Thus, this material has not been widely used outside of the credit card and novelty industry.

Within the food packaging industry it is known to use foils and the like for the wrapping of individual food pieces, for example. Sometimes, these foils are embossed with decorative or advertising logos and materials. In addition, it is known in this industry to laminate with glues metallized materials to paper elements for the wrapping of individual food pieces such as candies, gums and the like, for example. There is a long standing need, however, to provide holographic elements on to board stock like material in order to make boxes, containers and other elements that require such heavier cellulosic stocks.

Recently, a process for making large sheets of holographically enhanced material has been developed. Thus, the costs of such holographically enhanced material have been significantly reduced. However, these large sheets of material are usually placed on a plastic surface which is also rather expensive and thus the use of this material is still rather limited. If the holographic image could be further transferred to yet another substrate, one which was less expensive and one which had higher utility (board stocks useful in the fabrication of boxes, containers, advertisement sheets and the like), the use of holographically prepared images would find wider use in the use of these board stocks.

SUMMARY OF THE INVENTION

It is an object of this invention to provide a holographic image that can be transferred to another substrate. It is a further object to utilize a unique transferring process that can place a holographic image directly on a cheaper cellulosic substrate such as board stocks, for example. These and yet other objects are achieved in a board stock element, said board stock element having a holographic image having imparted thereon by laminating a metallized holographic image on a polymeric substrate to a board stock element under temperatures and pressure requisite to obtaining such lamination, and subsequently delaminating said board stock element from said polymeric substrate wherein said holographic element is transferred to said board stock element and said polymeric element can be metallized again for reuse.

In yet another embodiment, this invention may be achieved in a process for transferring a holographic image to a board stock element by laminating a metallized holographic image, said image having been imparted on a polymeric substrate, to said board stock element at a temperature greater than about 0° C. (about 32° F.) and a pressure greater than 0.15 pounds per square inch and subsequently delaminating said board stock element from said polymeric substrate, whereby said metallized holographic image is transferred to said board stock element and said holographic image on said polymeric substrate may be reused.

DETAILS OF THE INVENTION

Figure 1:
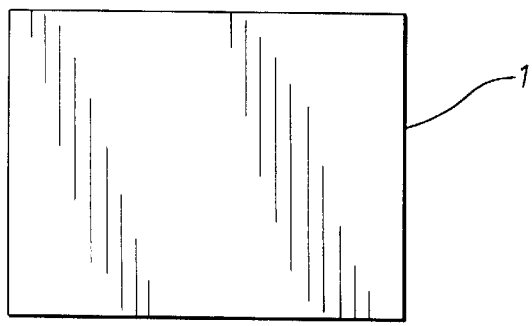
FIG. 1 is a top view of a holographic image prepared by the process described above and contained on a polymeric substrate.

Looking now specifically at the drawings which schematically show the holographic image which is transferable from a polymeric substrate to a more board stock element, FIG. 1 is a top view of an actual holographic image 1 contained on a polymeric substrate. The image has that 3- or 2-D holographic look that is well-known in the prior art, especially in the security art field.

Figure 2:
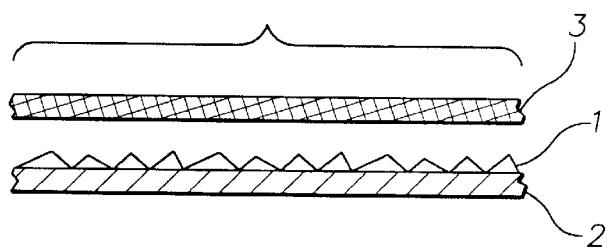
FIG. 2 is a drawing of a side view of FIG. 1. A board stock element is shown directly above the holographic image which is contained on a polymeric substrate in this Figure.

In FIG. 2, a side view drawing of the holographic image 1 from FIG. 2 is shown. In this figure, the polymeric substrate on which the holographic image is manufactured, is shown as 2. A board stock element 3 is shown located directly above the image.

Figure 3:
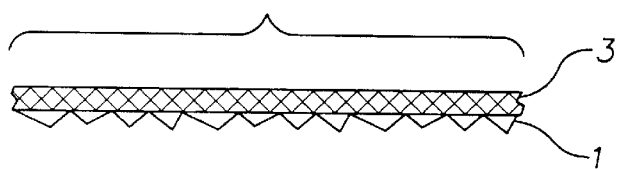
FIG. 3 is a drawing of a side view of a holographic image that has been transferred from the element of FIG. 1 directly to the board stock element of FIG. 2

In FIG. 3, the holographic image 1 has been transferred to the board stock element 3.

Figure 4:
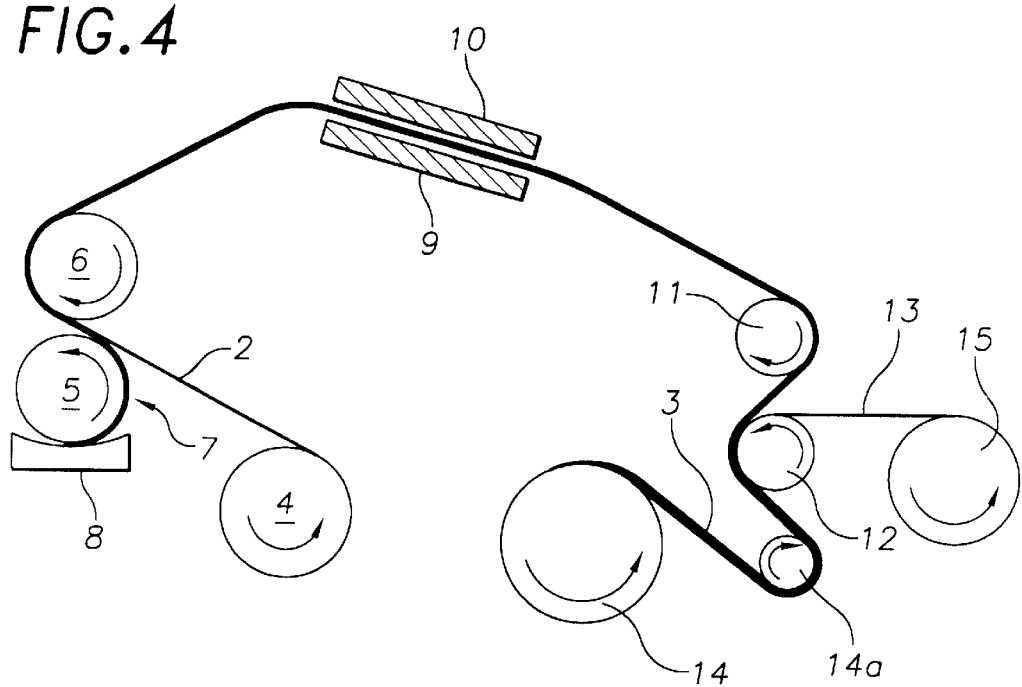
FIG. 4 is a drawing of a schematic process for the lamination of a polymeric substrate containing a holographic image to a board stock element.

FIG. 4 is a schematic drawing representing a novel process of this invention for the transfer of a holographic image from a polymeric substrate to a board stock element. In this figure, a holographic image 1 (not seen in this figure) on a polymeric substrate 2 is shown being pulled off an unwind roll 4 in a nip formed by opposing rollers 5 and 6. In this view, roll 5 is a standard gravure coating roll and roll 6 is a backup roll. A gravure doctor blade (to control coating weight) is shown as 7 and a coating pan (holding a standard adhesive solution) is shown as 8. The coated holographic image on a polymeric substrate is then carried through a drier which is indicated as 9 and 10 and subsequently down to heated rolls 11 and 12. In the nip formed by these last two rolls, a board stock element 3 taken from a roll 14 contacts the surface of the adhesive containing side of the dried, holographic image 1 contained on a polymeric substrate 2 and is laminated thereto. The rolls, which may be heated or cooled, activate the dried adhesive in order to permit such a lamination to occur. The resulting sandwich 13 is then passed over a chill roll 14a and then taken up by rewind roll 14.

Figure 5:
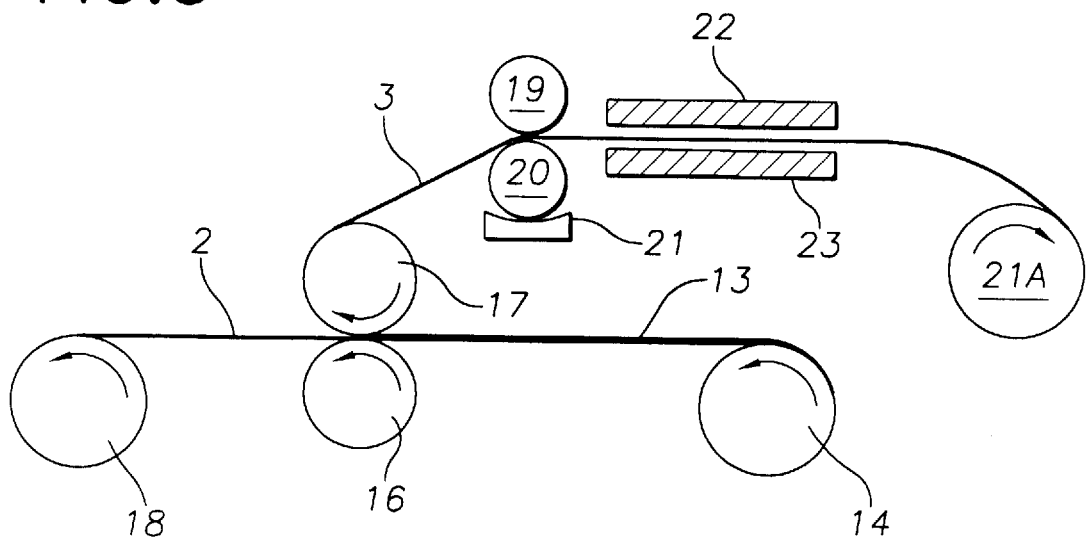
FIG. 5 is a drawing of a schematic process of direct delamination of the polymeric substrate from the board stock element to produce the holographic image of FIG. 2 directly on the board stock element.

The process of delamination is shown in FIG. 5. In this schematic drawing, the laminated sandwich material 13 is drawn off unwind roll 14 and taken through the nip of two delamination rolls 16 and 17. The even pull of the delamination rolls causes the holographic image to transfer from the polymeric substrate 2 to the board stock element 3. It is surmised that the holographic image, which has a glue surface on the top surface thereof, has a stronger affinity for the board stock element 3 than the polymeric substrate 2. The polymeric substrate 2 is then taken up on a film rewind roll 18 (this material can subsequently be reused and recycled by re-metallizing the image that has been etched thereon). The board stock element 3 now carrying the holographic image 1 thereon is taken up to coating heads 19 and 20. A protective layer may be applied over the holographic image contained on this board stock element in order to protect this image during handling. This may be applied at the nip of the coating heads and a pan 21 is graphically shown in this view. The holographic image on the board stock element is then carried into another drier to insure that the protective coating is hardened prior to be rolled up on to a final roll 21A. The roll of holographically imaged board stock is now ready to make board boxes or containers or to make advertisement signs and the like, for example.

Figure 6:
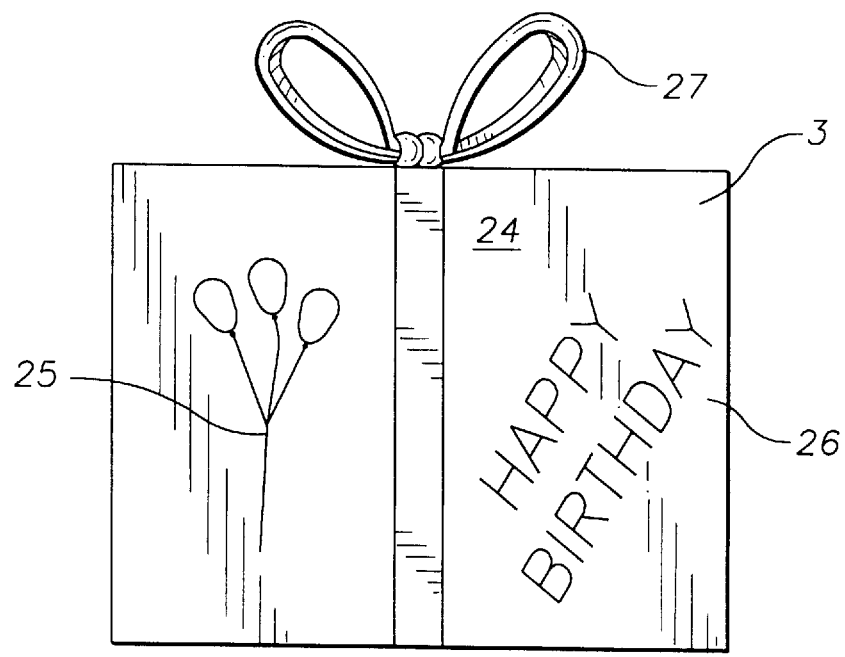
FIG. 6 is a side view of a board box which has a holographic image made by the process of this invention. Decorative elements and words have been holographically transferred to board stock element in order to enhance the box itself.

In FIG. 6, a side view of a board box 24 made using the board element 3 of this invention is shown. Some decorative balloons 25 and some wording 26, all in holographic imagery, are also shown. A ribbon 27 is also shown in this figure. This package, which is extremely decorative and novel, can contain a host of holographic images thereon. These can be applied The holographic image, transferred to the board stock element, is flashy and eye catching and this is the first such use thereof. The novel board stock can also be used to make any kind of box or container or sheet to contain advertisement, for example.

Although a variety of temperatures can be used within the ambit of this invention, I prefer a range of temperatures between 0° C. and 250° C. with a range of between 0° C. to 125° C. and more preferably at temperatures of between 25° C. to 100° C. at the nip of the lamination process of this invention. At the same time, a suitable pressure is applied to the nip to cause the two substrates, with the holographic image sandwiched between, to be laminated together. A pressure greater than 0.25 pounds per square inch and up to 1,000 pounds per square inch may be used, although I prefer 5 to 10 pounds per square inch.

It is most important that the temperature of any step of this process not be greater than 250° C. in order not to harm or deform the holographic images in any way. It was previously thought that since the material that made up a holographic image and the glues used therewith, would begin to degrade at 150° C. However, new materials and glues and the like can be heated at even higher temperatures. Looking again at FIG. 4, the conditions in the drier should be such that the surface of the polymeric substrate 2 carrying the holographic image 1 and a layer of adhesive material, be somewhere between 0° C. and 250° C. and most preferably 25 to 125 degrees Centigrade. One can design a drier which has a proper length and can emanate the proper degree of heat to match up with the web speed which is passing through this drier. The heated nip also should have a temperature of between 0° C. and 250° C. The purpose of the chill roll 14a is to set up the adhesive and insure that the board stock element 3 and holographic image 1 on the polymeric substrate 2 is secured. The adhesive material is well-known in the coating art and can be applied at a coating weight of between 0.5 to 14 pounds (dry) per ream of paper, wherein a ream is 500 sheets of board stock of 24 inches by 36 inches in size, and can be applied either to the board stock element or to the holographic image layer. Within the drawings which make up some of the best modes as envisioned at the time of filing of this invention, the adhesive layer is shown being applied to the holographic image first. Then, the board stock element contacts this layer at the heated nip rolls and is adhered thereto.

The protective layer that is applied over the top of the holographic image that has been transferred to the board stock element by delamination, as shown in FIG. 5, can be any of a host of conventional materials such as solvent or water based acrylics, for example. This protective layer may be colored or tinted to provide requisite color matching to colored board stock layers, for example.

I can use a host of board stock elements within the metes and bounds of this invention. For example, if one wishes to have holographically enhanced box or container for a host elements regular board stock may be used within the ambit of this invention. By board stock I mean that which is said to have 80 to 300 pounds per ream and preferably 120 to 240 pounds per ream, with a ream defined as 1,000 sheets based on medium density board stock of 24 inches by 36 inches in size. Also used in the prior art is a definition using a point system where ranges will be defined as 8 point through 24 point board, based on the same medium density board. This board stock element is particularly useful in the manufacture of boxes and containers and also in the advertising industry.

The conventionally holographically imaged polymeric substrates include many of the commonly available plastics, for example. These will include polyethylenes, polypropylenes, polyethylene terephthalates, among others, for example. These substrates are usually 0.03 to 4.0 mils in thickness.

The board stock elements on which the holographic images have been transferred may be used in a host of applications including the manufacture of boxes or containers which will contain any number of conventional items such as soft drink and beers contained in six pack bottle and can carriers and other types of beverage, food and toiletry containers; store or other advertisement sheets; etc. The holographic image may be altered for the use desired. Advertising and decorative images are also envisioned within this invention. Such applications will find wide use within the various industries that employ board stock of this sort.

The ability to dry-bond laminate and then to delaminate the elements described within this invention represents a unique process since it was not widely known that holographic images could be so transferred. The process as described above uses some unique equipment that is designed to hold, laminate and then delaminate board stock elements. It was not known in the prior art to provide such decorative board stock. It is necessary to insure that all of the elements of the process are carefully maintained within processing limits. The use of elements produced within the scope of this invention greatly increases the utility of holographic images within a broader scope. This means that holographic images with larger images, images that can utilize advertising and logos and the like, are now possible.

What is claimed is:

1. A process for transferring a metallized holographic image from a second support to a board stock element, said second support comprising in order:
   a. a polymeric support having a holographic image therein;
   b. a metal applied over said holographic image to enhance said holographic image by metallization thereof, said metal forming the metallized holographic image, and,
   c. an adhesive layer coated on said metallized holographic image and subsequently dried, said process comprising the steps of:
      a-1. laminating the dried adhesive layer of said second support to said board stock element at a temperature of between 0° C. and 250° C. and a pressure of between 0.15 and 1,000 pounds per square inch; and,
      b-1. delaminating the polymeric support having a holographic image therein from the metallized holographic image to substantially transfer all of said metallized holographic image to said board stock element, whereby said polymeric support having said holographic image therein is capable of being re-metallized for re-use.

2. The process of claim 1 wherein said temperature is between 25° C. and 125° C. and said pressure is between 0.05 and 10 pounds per square inch.

3. The process of claim 1 wherein said board stock element has a weight of between 80 and 300 pounds per ream wherein said ream is defined as 1,000 sheets of medium density board stock of 24 inches by 36 inches in size.

4. The process of claim 1 wherein a protective layer is applied over said transferred metallized holographic image on said board stock element of b-1.

* * * * *

UNITED STATES PATENT AND TRADEMARK OFFICE
CERTIFICATE OF CORRECTION

PATENT NO. : 5,871,608
DATED : February 16, 1999
INVENTOR(S) : Michael J. Stepanek It is certified that error appears in the above-indentified patent and that said Letters Patent is hereby corrected as shown below:

Column 6, Claim 3, line 24, change "1,000 sheeets" to read --- 500 sheets ---.

Signed and Sealed this

Twentieth Day of March, 2001

Attest:

NICHOLAS P. GODICI

*Attesting Officer*   *Acting Director of the United States Patent and Trademark Office*